(12) United States Patent
Daskalakis

(10) Patent No.: US 7,419,426 B2
(45) Date of Patent: Sep. 2, 2008

(54) METHODS AND SYSTEMS FOR A SINGLE JURISDICTION RAFFLE IN A DISTRIBUTED COMPUTING NETWORK

(75) Inventor: Panos Daskalakis, Boston, MA (US)

(73) Assignee: MCD Enterprises, Inc., Boston, MA (US)

( * ) Notice: Subject to any disclaimer, the term of this patent is extended or adjusted under 35 U.S.C. 154(b) by 151 days.

(21) Appl. No.: 11/064,618

(22) Filed: Feb. 24, 2005

(65) Prior Publication Data

US 2005/0187021 A1    Aug. 25, 2005

Related U.S. Application Data

(60) Provisional application No. 60/547,113, filed on Feb. 24, 2004.

(51) Int. Cl.
    *A63F 3/08* (2006.01)
(52) U.S. Cl. .............................. 463/17; 463/42; 705/14
(58) Field of Classification Search ............. 463/16–20, 463/40–43, 29; 705/1, 14, 500
    See application file for complete search history.

(56) References Cited

U.S. PATENT DOCUMENTS

| 5,708,780 | A | 1/1998 | Levergood et al. |
|---|---|---|---|
| 5,953,012 | A | 9/1999 | Veghte et al. |
| 6,519,572 | B1 | 2/2003 | Riordan et al. |
| 6,574,606 | B1 | 6/2003 | Bell et al. |
| 6,604,681 | B1 | 8/2003 | Burke et al. |
| 6,887,152 | B2 * | 5/2005 | Stanek ........................ 463/17 |
| 2001/0037239 | A1 | 11/2001 | Kanatani |
| 2003/0040363 | A1 * | 2/2003 | Sandberg ..................... 463/42 |

* cited by examiner

*Primary Examiner*—Scott E Jones
(74) *Attorney, Agent, or Firm*—George N. Chaclas; Edwards Angell Palmer & Dodge LLP

(57) ABSTRACT

A server facilitates a raffle within a single jurisdiction, wherein the server communicates with clients via a network. The server includes a memory storing an operating system, an instruction set, agent data, sponsor data and Web site data. A processor runs the instruction set and communicates with the memory and the network. The processor is operative to present rules associated with the raffle to entrants, receive acceptance of the rules by entrants, and accept an order for the raffle from entrants. The processor is also operative to associate an entrant agent with each entrant, issue tickets for the raffle to the entrant agent, determine a winner of the raffle and notify the winner to collect a prize associated with the raffle. Preferably, the prize is a high intangible value item.

14 Claims, 3 Drawing Sheets

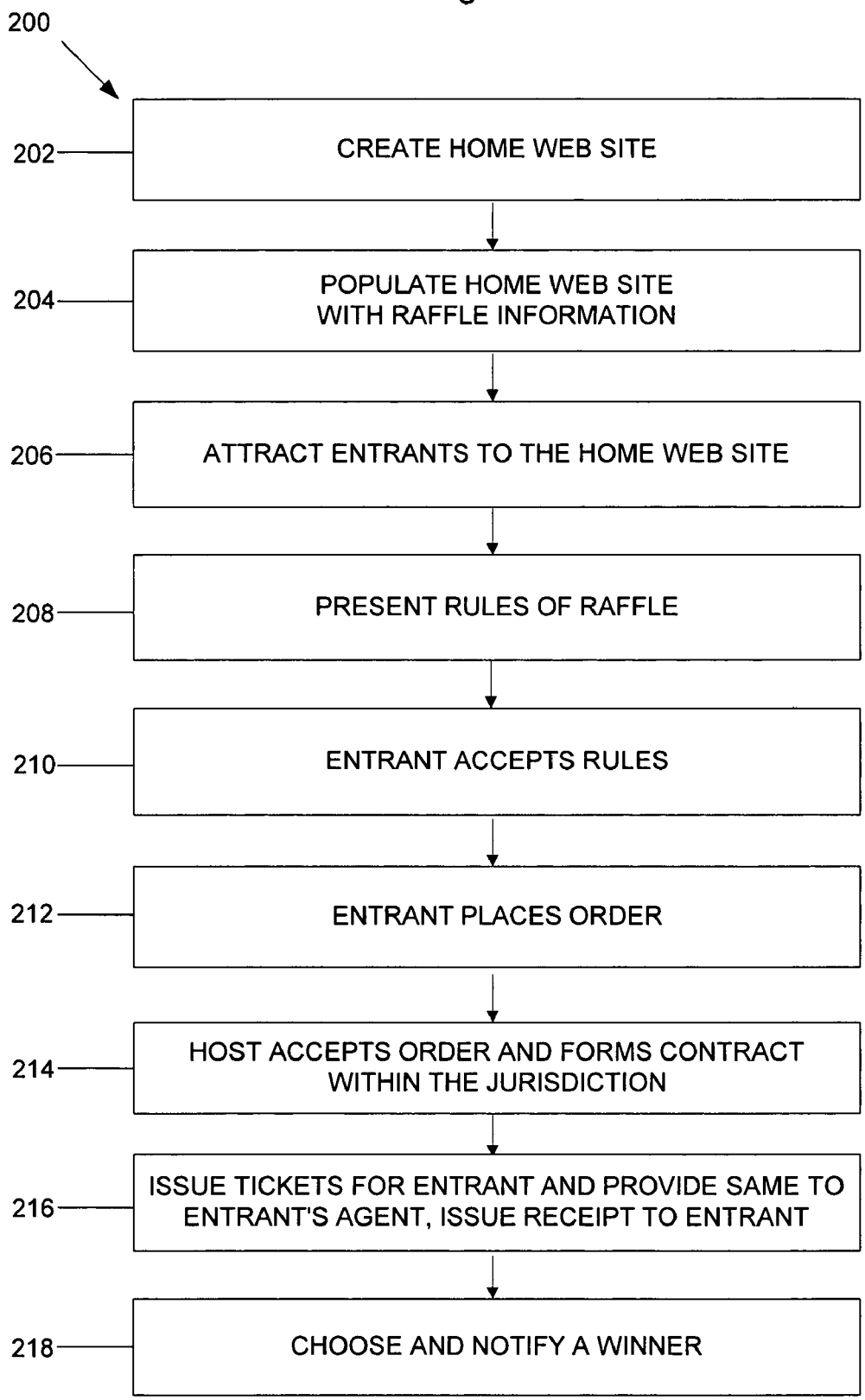

METHODS AND SYSTEMS FOR A SINGLE JURISDICTION RAFFLE IN A DISTRIBUTED COMPUTING NETWORK

CROSS-REFERENCE TO RELATED APPLICATION

This application claims priority to U.S. Provisional Patent Application No. 60/547,113, filed Feb. 24, 2004, which is incorporated herein by reference.

BACKGROUND OF THE INVENTION

1. Field of the Invention

The subject disclosure relates to methods and systems for raffles via a distributed computing network, and more particularly to improved methods and systems for raffles being conducted within a single jurisdiction while utilizing the inherent distribution benefits of a distributed computing network and the innate demand and cost characteristics of high intangible value low tangible value assets.

2. Background of the Related Art

With regard to raffles and lotteries, the terms often being interchangeable, both have been used for thousands of years. Moses used a lottery to award land west of the River Jordan. Raffles have funded everything from the Great Wall of China to the first British settlement in North America, Jamestown Va. (interestingly, Anglican Churches held two of three winning tickets for the Jamestown lottery). In America, the continental congress used lotteries to fund the revolutionary war and John Hancock used a lottery to rebuild historic Faneuil Hall in Boston. From 1790 to the Civil War, 50 colleges, 300 schools and 200 churches were funded by lotteries, of these the most notable being Harvard, Yale, Princeton, and Columbia.

However, from 1820 through 1878, corruption in privately operated lotteries became rampant and governments, unable to regulate these lotteries, began to prohibit them. The first state to do so being New York which passed a constitutional ban on lotteries in the 1820's. Many states followed and by 1878, the only state that allowed lotteries was Louisiana. In 1890, Congress banned all lottery material from the U.S. Mail and in 1895 Congress banned all lottery material from interstate commerce. In 1905, the U.S. Supreme Court reaffirmed the states' use of police powers to control gaming to effectively end the Louisiana Lottery (which was a private lottery) and all other gambling.

In the 1950's, the U.S. Government began allowing charities to conduct certain types of gaming and, in 1964, the New Hampshire Legislature created a state lottery, the first legal state lottery in the $20^{th}$ century. It was labeled a "Sweepstakes" and tied to horse races to avoid the 70 year-old federal anti-lottery statutes. In 1967, New York became the second state to attempt a lottery and several other states followed. In 1971, Automated Wagering implemented the worlds first on-line lottery system in New Jersey. Subsequently, several federal laws and U.S. Supreme Court rulings have allowed not only lotteries but also casino gambling to establish itself in the United States. These laws have also provided additional opportunities for non-profit charities to participate in gaming. However, while these laws have expanded lotteries and gaming in the United States, they have also sought to restrict interstate competition between State run lotteries and to prevent on-line casino gambling, which is operated from outside the United States.

As can be seen, raffles and lotteries have been widely used and well understood in the art. As noted above, in the United States, such devices are governed by state law. As a result, the ability to conduct an interstate raffle is limited by the requirement of needing to clear the legal hurdles in each and every state.

Further, prize winners for many raffles become disillusioned when they learn that a tax consequence results from the value of the prize. However, there are numerous assets that have little or no tangible value but an extremely high intangible value. These assets include such items as golfing with Tiger Woods, being the honorary captain of one of the Super Bowl teams, calling the coin toss for your team at the Super Bowl, or even having Easter Dinner with the Pope at the Vatican. Tens or even hundreds of millions of people worldwide would like to get one of these assets. Yet each of these assets is relatively unique and, thus, there is not enough supply necessary to meet the demand. Currently, the holders of these assets will at times, for charity, auction them off to the highest bidder.

The results of these auctions in general are less then stellar. For example, at a recent Sotheby's Auction for the Elizabeth Glaser Pediatric AIDS Foundation, such assets were auctioned off at an average auction price of $7,500 and the highest price paid for any one item was $13,000 (results as presented on NBC's "The Apprentice" which aired on Feb. 12, 2004). The items auctioned off included a walk-on role on NBC's "Third Watch", a day with Regis Philbin; an evening of disco bowling with the stars from "Queer Eye for the Straight Guy", and the item receiving the highest bid, dinner for fifty at Rocco DiSpirito's.

In recent times, the Internet has become recognized as an efficient means for connecting buyers and sellers of a variety of items. On-line retailers and auctioneers have had great success. The Internet has also been envisioned as a tool in many other consumer related transactional matters. For example, see U.S. Pat. No. 6,519,572 to Riordan et al., U.S. Pat. No. 6,604,681 to Burke et al., U.S. Pat. No. 6,574,606 to Bell et al., each of which is incorporated herein by reference. However, attempts at using the Internet have not properly leveraged the technology to be successful. For example, see published U.S. Patent Application Nos. 2002/0152130 and 2001/0037239, each of which is incorporated herein by reference. One reason for the poor performance is that entities simply take the traditional raffles, for traditional types of prizes such as trips, televisions or automobiles, and simply move on-line. Although this created substantial savings in processing costs, such as printing tickets and the waste of left over tickets, what the entities failed to realize is that tickets were more often sold more on guilt than demand for the prize. Without additional drive of demand, the wider audience proved meaningless. Accordingly, traditional raffle profits are rarely above 32% of the gross proceeds with typical meager profits of $6,500 per raffle.

SUMMARY OF THE INVENTION

In view of the above, a need exists for methods and systems that utilize the tremendous distribution of efficiency of the Internet, leverage the high demand of high intangible value, low tangible value assets and provide entrants in multiple jurisdictions with access to a raffle conducted wholly in a single jurisdiction.

The present disclosure is directed to a server that facilitates a raffle within a single jurisdiction, wherein the server communicates with clients via a network. The server includes a memory storing an operating system, an instruction set, agent data, sponsor data and Web site data. A processor runs the instruction set and is in communication with the memory and the distributed computing network. The processor is operative to present rules associated with the raffle to a plurality of entrants, receive acceptance of the rules by the entrants, and accept an order for the raffle from each of the entrants. The processor is also operative to associate the entrant agent with each of the entrants, issue tickets for the raffle to the entrant agent, determine a winner of the raffle and notify the winner to collect a prize associated with the raffle.

It is an object of the subject disclosure to provide a raffle contained within a single jurisdiction but that has entrants from a plurality of jurisdictions.

It is another object of the disclosure to provide a raffle that leverages high intangible value prizes. By using prizes of high intangible value and low tangible value, the raffle realizes substantial, real cash, returns from the high intangible value, low tangible value, asset by substantially increasing demand, substantially lowering costs, and thus substantially increasing the profits generated by the raffle.

It is still another object of the disclosure to provide a raffle that yield increased profitability as compared to other raffles.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

FIG. 3 is a flow diagram of a process performed to conduct a raffle in accordance with the subject disclosure.

DETAILED DESCRIPTION OF PREFERRED EMBODIMENTS

Figure 1:
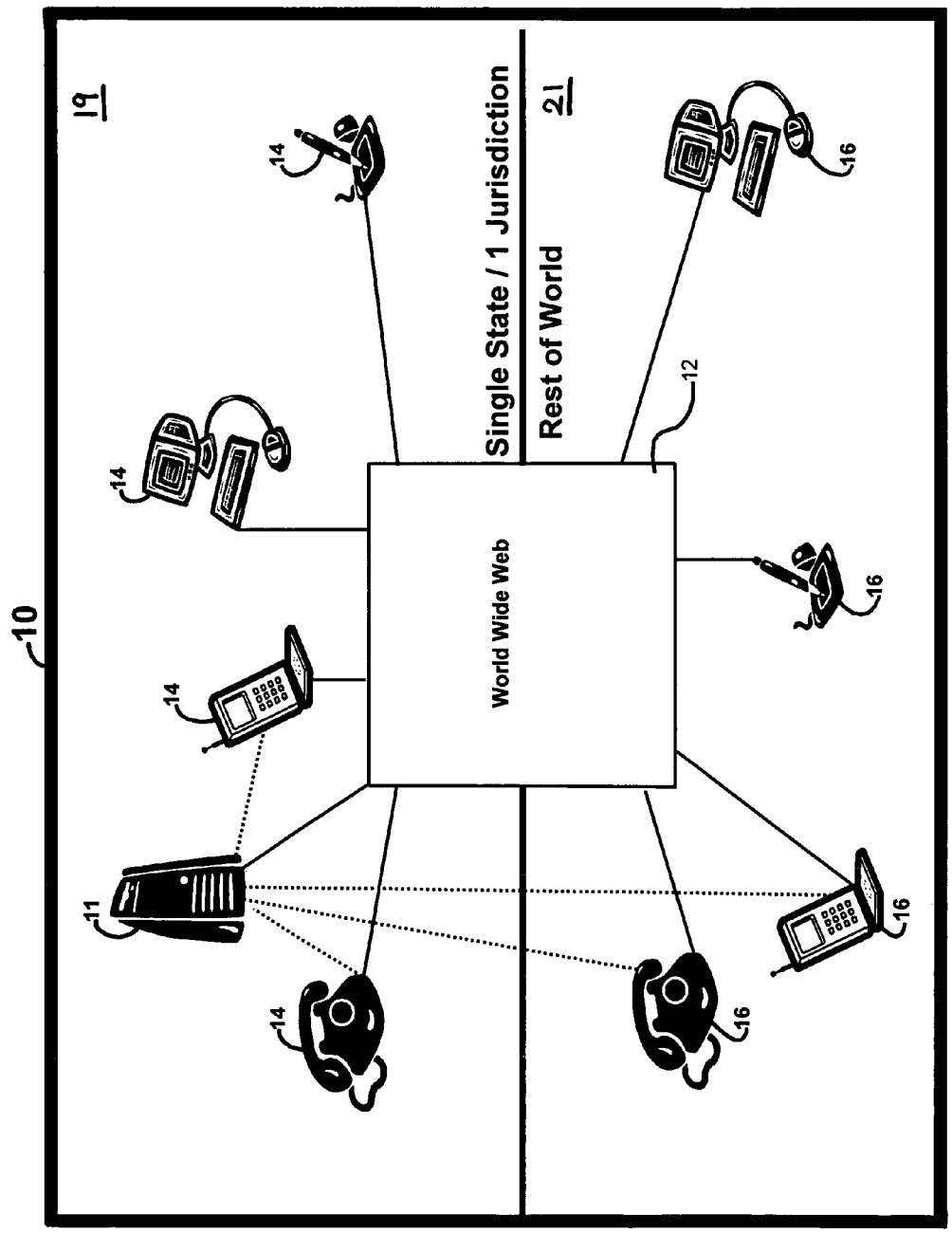
FIG. 1 is a diagram showing an environment for conducting a raffle in accordance with the subject disclosure.

The present invention overcomes many of the prior art problems associated with conducting raffles. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring now to the FIG. 1, there is shown a block diagram of an environment 10 for implementing the methodology of the present disclosure. In the environment 10, a plurality of entrants from many jurisdictions participate in a single raffle. The raffle connects agents with on-line entrants so that the high intangible value of the prizes can be advantageously utilized. The following discussion describes the structure of such an environment 10 but further discussion of the applications program and data modules that embody the methodology of the present invention is described elsewhere herein as would be appreciated by those of ordinary skill in the pertinent art.

The environment 10 includes one or more servers 11 which communicate with a distributed computing network 12 via communication channels, whether wired or wireless, as is well known to those of ordinary skill in the pertinent art. In the preferred embodiment, the distributed computing network 12 is the Internet. For simplicity, one server 11 is shown.

Figure 2:
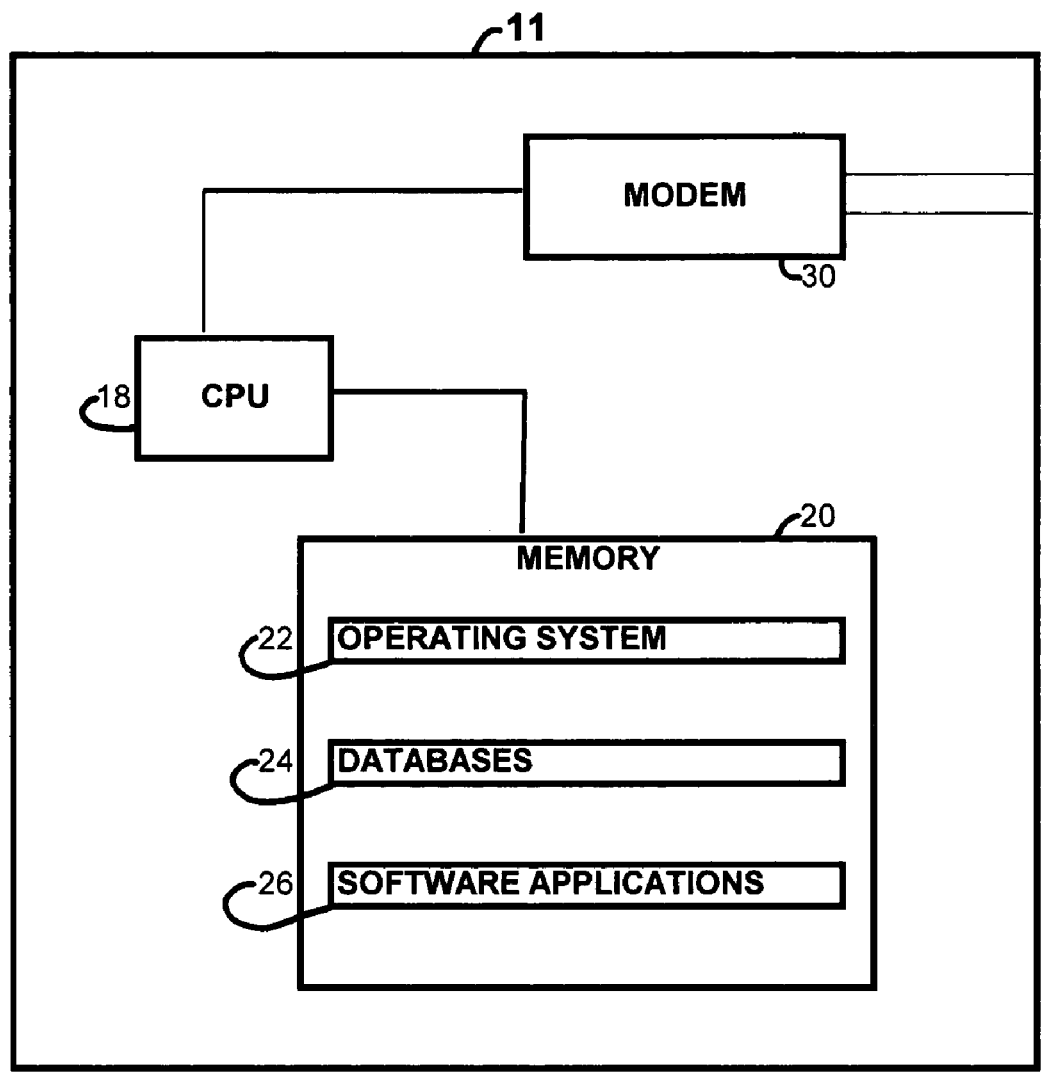
FIG. 2 is a schematic view of a server for use in the environment of FIG. 1.

Referring now to FIG. 2, server 11 hosts multiple Web sites and houses multiple databases necessary for the proper operation of the methods and systems in accordance with the subject invention. The server 11 is any of a number of servers known to those skilled in the art that are intended to be operably connected to a network so as to operably link to a plurality of clients 14, 16 via the distributed computing network 12. As illustration, the server 11 typically includes a central processing unit or cpu 18 including one or more microprocessors such as those manufactured by Intel or AMD and memory 20 operatively connected to the cpu 18. The memory 20 can be any combination of random access memory (RAM), a storage medium such as a magnetic hard disk drive(s) and the like.

A hard disk drive of the server 11 may be used for storing an operating system 22, databases 24, software applications 26 for execution on the central processing unit 18, and the like. The hard disk drive of the server 11 also typically controls booting and storing the operating system 22, as well as other applications or systems that are to be executed on the server 11 such as paging and swapping between the hard disk and the RAM. Software, code or software applications 26 generally refers to computer instructions which, when executed on the cpu 18, cause interactions with operating parameters, sequence data/parameters, database entries, network connection parameters/data, variables, constants, software libraries, and/or any other elements needed for the proper execution of the instructions, within an execution environment in the memory 20 of the server 11. Those of ordinary skill will recognize that the software applications 26 and various processes discussed herein are merely exemplary of the functionality performed by the disclosed technology and thus such processes and/or their equivalents may be implemented in commercial embodiments in various combinations and quantities without materially affecting the operation of the disclosed technology.

The server 11 also includes other mechanisms and structures for performing I/O operations such as disk drives (not shown) and a modem 30 for communicating with the distributed computing network 12.

It is envisioned that the server 11 can utilize multiple servers in cooperation to facilitate greater performance and stability of the subject invention by distributing memory and processing as is well known. U.S. Pat. No. 5,953,012 to Venghte et al. describes a method and system for connecting to, browsing and accessing computer network resources and is herein incorporated by reference in its entirety. Similarly, U.S. Pat. No. 5,708,780 to Levergood et al. describes an Internet server which controls and monitors access to network servers and is also herein incorporated by reference in its entirety.

Referring again to FIG. 1, distributed computing network 12 may include any number of network systems well known to those skilled in the art. The distributed computing network 12 can be a series of network nodes (each node being a digital data processing device, for example) that can be interconnected by network devices and communication lines (e.g., public carrier lines, private lines, satellite lines, etc.) that enable the network nodes to communicate. The transfer of data (e.g., messages) between network nodes can be facilitated by network devices such as routers, switches, multiplexers, bridges, gateways, etc. that can manipulate and/or route data from an originating node to a destination node regardless of any dissimilarities in the network topology (e.g., bus, star, token ring, etc.), spatial distance (local, metropolitan, wide area network, etc.), transmission technology (e.g., TCP/IP, Systems Network Architecture, etc.), data type (e.g., data, voice, video, multimedia, etc.), nature of connection (e.g., switched, non-switched, dial-up, dedicated, virtual, etc.), and/or physical link (e.g., optical fiber, coaxial cable, twisted pair, wireless, etc.) between the originating and destination network nodes. For example, distributed computing network 12 may be a combination of local area networks (LAN), wide area networks (WAN), or, as is well known. For the Internet, the preferred method of accessing information is the World Wide Web because navigation is intuitive and does not require technical knowledge.

The environment 10 also includes a plurality of input devices or clients 14, 16 such as desktop computers, laptop computers, personal digital assistants, cellular telephones and the like. The clients 14, 16 communicate with the distributed computing network 12 to allow users to access information on the server 11. For simplicity, only four clients 14, 16 are shown. In the exemplary illustration shown, server 11 and clients 14 are in a single jurisdiction 19 or, in the case of the United States, a single state whereas clients 16 are located in a one or more different jurisdictions 21. Some clients 14, 16 are also capable of being interconnected directly to server 11 as would be known to those of ordinary skill in the art.

The clients 14, 16 have displays and an input device(s) as would be appreciated by those of ordinary skill in the pertinent art. The display may be any of a number of devices known to those skilled in the art for displaying images responsive to outputs signals from the computers 14, 16. Such devices include but are not limited to cathode ray tubes (CRT), liquid crystal displays (LCDS), plasma screens and the like. Although a simplified diagram is illustrated in FIG. 1 such illustration shall not be construed as limiting the present invention to the illustrated embodiment. It should be recognized that the signals being outputted from the clients 14, 16 can originate from any of a number of devices including PCI or AGP video boards or cards mounted within housings of the clients 14, 16 that are operably coupled to the microprocessors and the displays of the clients 14, 16.

Clients 14 typically provide administrative access to the environment 10 whereas clients 16 are associated with users and/or entrants in the raffle although it will be recognized by those of ordinary skill in the art that the hardware of the clients 14, 16 would often be interchangeable. A plurality of consumers typically can share the same client 14 and cookie technology can be utilized to facilitate access to the environment 10 and, thereby, a raffle conducted in accordance with the subject disclosure. A plurality of users can utilize the environment 10 simultaneously.

The clients 14, 16 are also preferably equipped with an input device(s) as is known to those skilled in the art which can be used to provide input signals for control of applications programs and other programs such as the operating system being executed on the clients 14, 16. In illustrative embodiments, the input device preferably comprises a switch, a slide, a mouse, a track ball, a glide point or a joystick, a microphone or other such device (e.g., a keyboard having an integrally mounted glide point or mouse) by which a user such as a consumer can input control signals and other commands. Although the use of a keyboard as an input device for the server 11 and clients 14, 16 is not described further herein, it is within the scope of the present invention for the input device to comprise any of a number of input means known to those skilled in the art, wherein the control signals or commands for implementing and interacting with the environment 10 and the applications program embodying such methodology can be implemented in the form of discrete commands from an input device.

The clients 14, 16 typically include a central processing unit including one or more micro-processors such as those manufactured by Intel or AMD, random access memory (RAM), mechanisms and structures for performing I/O operations (not shown), a storage medium such as a magnetic hard disk drive(s), a device for reading from and/or writing to removable computer readable media and an operating system for execution on the central processing unit. According to one embodiment, the hard disk drive of the clients 14, 16 is for purposes of booting and storing the operating system, other applications or systems that are to be executed on the computer, paging and swapping between the hard disk and the RAM and the like. In one embodiment, the application programs reside on the hard disk drive for performing the functions in accordance with the subject disclosure. In another embodiment, the hard disk drive simply has a browser for accessing an application hosted within the distributed computing network 12. The clients 14, 16 can also utilize a removable computer readable medium such as a CD or DVD type of media that is inserted therein for reading and/or writing to the removable computer readable media. As can be seen from the above, a schematic diagram of a client 14, 16 would indeed be functionally equivalent to the server 11 of FIG. 2 although one is not included herein and, for simplicity, several components are not shown.

Referring now to FIG. 3, there is illustrated a flowchart 200 depicting a process for providing a raffle to Internet users or entrants in accordance with an embodiment of the present invention. At step 202, a host company (not shown) creates a home Web site on server 11 to present raffle information to entrants in the form of a plurality of Web pages. Further, the host may maintain banner advertisements and links to related Web sites on the home Web site as a source of additional revenue. Preferably, the banner advertisements and links are associated with national and local vendors of complimentary goods and services and the company receives a further fee based upon referrals from same.

It is envisioned that the raffle provides for administration and security maintenance. Therefore, although many users may access the home Web site, even if such users do not become entrants (e.g., Internet surfers, hackers and the curious), each user's access is controlled. The user interface specifies which aspects of the home Web site can be accessed, and at what level in order to maintain compliance with technical electronic data interchange standards, legal confidentiality restraints, system integrity and the like. Such limitations of functionality are well known to those skilled in the art and therefore not further described herein.

At step 204, the host demonstrates the home Web site to various charitable organizations and other entities that would benefit from a raffle in accordance with the subject disclosure. When an entity or sponsor engages the host to run a raffle, the host charges a fee in exchange for the services provided. The fee may be a set amount, a percentage of the gross or net proceeds from the raffle, combinations thereof and like arrangements as would be appreciated by those of ordinary skill in the art. The sponsor licenses the raffle with the relevant jurisdiction.

For each raffle, specific Web pages are created at within the home Web site. The sponsor may include links to the Web pages through their own Web site or include the same pages within their own Web site. The host stores relevant data in records that are preferably stored in a relational database 24 in server 11. Preferably, the raffle prize is a celebrity related, high intangible value, low tangible value asset. The celebrity nature of the raffle prize allows capitalizing on traditional media outlets without charge to the host. The high intangible value will create interest among potential entrants and the low tangible value will prevent any significant tax consequences for the winner.

At step 206, the host and sponsor promote the home Web site to attract potential entrant traffic. Ideally, a celebrity associated with the prize will, by nature of their celebrity, have occasion to promote the raffle and associated home Web site or Web page as the case may be. Typical promotions may also include identifying the home Web address on advertising and cooperation with a search engine that may direct a user to the home Web site based upon a search. Once a user is attracted to the home Web site, a Web page (not shown) is presented. The Web page includes an input area for allowing a user to learn more about the raffle. If the user decides to become an entrant, the user would provide such input to the home Web site by selecting an icon or the like and the process proceeds to step 208.

At step 208 of FIG. 3, the host Web site presents the rules of the raffle to the entrant. In a preferred embodiment, the raffle rules are as follows:

1. The entrant provides the host with irrevocable, limited power of attorney to retain the services of an agent for the entrant. Preferably, the entrant's agent is a local attorney paid, at least in part, by the sponsor to act as such. A portion of the cost of the ticket would be identified as paid to the entrant's agent to act as consideration for the contract between the entrant and their agent.
2. The entrant provides the entrant's agent with irrevocable, limited power of attorney to hold the entrant's raffle tickets on behalf of the entrant.
3. The entrant provides the host conducting the raffle with permission to transfer the entrant's raffle tickets to the entrant's agent.
4. The entrant agrees that the prize is claimed within the jurisdiction.
5. The entrant agrees that all elements of the raffle are being conducted entirely within the jurisdiction in which the raffle is licensed.

Still referring to FIG. 2, at step 210, the entrant accepts the rules of the raffle. Subsequently, the host Web site presents additional Web pages to the entrant so that indication of the entrant's order may be placed and received at step 212. The presented information could be a pricing, availability, deadlines and the like.

At step 214, the host Web site accepts the order with credit card information. In a preferred embodiment, the host interacts with a credit card processing entity to validate the information. Then, the host acknowledges and agrees to the entrant's offer to purchase. As a result, one or more contracts are formed within the jurisdiction. The host stores relevant data in records that are preferably stored in a relational database 24 in server 11. Preferably, each entrant record includes an entrant identifier of a credit card number or other means for payment now known and later developed, the associated raffle, the number of entries, the associated entry information, the entrant's agent information and the like. The host processes the order through a credit card authorization or other acceptable payment method now known or later developed as would be appreciated by those of ordinary skill in the art.

At step 216, the host issues the tickets for the entrant. By issuing the tickets, the host sends electronic tickets to a client 14 of the entrant's agent via the distributed computing network 12. Of course, such communications may be encrypted with public/secret key technology and the like to protect the integrity of the transactions. At the entrant agent's client 14, the entrant's electronic tickets are stored in a database. In another embodiment, the issuance of the tickets to the entrant's agent is a traditional paper transaction. The entrant receives a receipt electronically for storage on a client 16 associated therewith or for printing. It is envisioned that the receipt includes reference numbers that are not the ticket numbers but may be used to identify or determine the ticket numbers. In another embodiment, the host creates multiple databases on server 11. A first database includes the records associated with the entrants but is not available to the entrant's agent. Another second database includes the records that contain the information required by the entrant's agent. The second database would be accessible by the entrant's agent. Upon closing of the raffle, the process proceeds to step 218.

At step 218, the host determines a winner of the raffle. The determination may occur electronically by a random number generated process or traditional methods like balls in a hopper or tickets selected from a shaken barrel may be used. In the preferred embodiment, the winning entrant is notified by electronic mail at the electronic mail address associated with their entrant record. The winning entrant has several possible options to claim the prize within the licensed jurisdiction as follows:

a. Appear in person within the jurisdiction in which the raffle is licensed to claim the prize.
b. Provide satisfactory power of attorney to another party to appear in person within the jurisdiction in which the raffle is licensed to claim the prize on behalf of the winner.
c. Provide the entrant's agent with satisfactory power of attorney to claim the prize on behalf of the winning entrant, which the entrant's agent, pursuant to the entrants agent agreement will do at no additional charge. In an alternative embodiment, the entrant's agent charges a set fee for passing the prize along to the entrant.

As a result, it can be seen that the subject disclosure teaches systems and methods for conducting a highly profitable raffle. It is envisioned that cost for prizes, if any, would be less than 0.5% of revenue and, processing costs and amortization of fixed costs would be less then 7%. Consequently, the yield can be as high as or higher than approximately 92%.

In another preferred embodiment, the entrant has the choice of entering the raffle by telephone or electronic mail. Such entries may pass through the distributed computing network 12 or directly to server 11 as noted by the dashed connection lines of FIG. 1. The server 11 compiles statistics related to the raffle and determines payouts to the sponsor, host and agents as appropriate. In another embodiment, the host Web site is offered as an Internet hosted application or software application where each sponsor can customize the Web pages in accordance with their own liking. Such a sponsor is hereinafter referred to as affiliates. The affiliates would pay a licensing fee to the host. In one embodiment, such a software application is a desktop computer application that is either downloaded or provided on a compact disk. It is envisioned that the one jurisdiction may be a city within a state, a state within a country, a country within a union, a continent within a hemisphere and the like.

It will be appreciated by those of ordinary skill in the pertinent art that the functions of several elements may, in alternative embodiments, be carried out by fewer, or a single element. Similarly, in some embodiments, any functional element may perform fewer, or different, operations than those described with respect to the illustrated embodiment. Also, functional elements (e.g., modules, databases, interfaces, computers, servers and the like) described as distinct for purposes of illustration may be incorporated within other functional elements in a particular implementation.

While the invention has been described with respect to preferred embodiments, those skilled in the art will readily appreciate that various changes and/or modifications can be made to the invention without departing from the spirit or scope of the invention as defined by the appended claims.

What is claimed is:

1. A server for facilitating a raffle, wherein the server communicates with clients via a distributed computing network, and wherein the server comprises:
   (a) a memory storing an operating system, an instruction set, agent data related to at least one entrant agent residing in a first jurisdiction, sponsor data related to at least one raffle within the first jurisdiction and site data related to electronic pages associated with the at least one raffle; and
   (b) a processor for running the instruction set, the processor being in communication with the memory and the distributed computing network, wherein the processor is operative to:
      (i) present rules associated with the at least one raffle to a plurality of entrants, the entrants residing in a second jurisdiction outside the first jurisdiction;
      (ii) receive acceptance of the rules by the entrants;
      (iii) accept an order for the at least one raffle from each of the entrants;
      (iv) form a contract between the entrant agent and each of the entrants so the entrant agent is authorized to purchase tickets on behalf of the entrants;
      (v) issue tickets for the raffle to the purchasing entrant agent, each ticket being associated with one of the entrants and held by the purchasing entrant agent on behalf of the respective entrant;
      (vi) determine a winning ticket of the at least one raffle from the tickets; and
      (vii) if the winning ticket was issued to the purchasing entrant agent, identify and notify the entrant associated with the winning ticket to collect a prize associated with the at least one raffle.

2. A server as recited in claim 1, wherein the entrant agent is the same entity as that providing the server.

3. A server as recited in claim 1, wherein the tickets are electronic.

4. A server as recited in claim 1, wherein the distributed computing network is the Internet and the entrants are located in a plurality of states.

5. A server as recited in claim 1, wherein the prize is a high intangible value prize.

6. A server as recited in claim 1, wherein the processor is further operative to receive payment for the order from the entrant and provide a portion of the payment to the entrant agent.

7. A server as recited in claim 1, wherein the prize is collected from the entrant agent by the entrant.

8. A method for conducting raffles within a single jurisdiction, wherein a server communicates with clients via a distributed computing network, the method comprising the steps of:
   (a) presenting rules associated with the at least one raffle to a plurality of entrants;
   (b) receiving acceptance of the rules by the entrants;
   (c) accepting an order for the at least one raffle from each of the entrants;
   (d) forming a contract between an entrant agent and each of the entrants such that the entrant agent represents the entrants;
   (e) issuing tickets for the raffle to the entrant agent as the entrant agent purchases the tickets on behalf of the entrants;
   (f) determining a winner of the at least one raffle; and
   (g) notifying the winner to collect a prize associated with the at least one raffle.

9. A method as recited in claim 8, further comprising the step of the entrant collecting the prize from the entrant agent.

10. A system for conducting raffles comprising:
    (a) first means for presenting rules associated with the at least one raffle to a plurality of entrants;
    (b) second means for receiving acceptance of the rules by the entrants;
    (c) third means for accepting an order for the at least one raffle from each of the entrants;
    (d) fourth means for forming a contract between an entrant agent and each of the entrants such that the entrant agent represents the entrants;
    (e) fifth means for issuing tickets for the raffle to the entrant agent on behalf of the entrants when the entrant agent purchases the tickets;
    (f) sixth means for determining a winning ticket of the at least one raffle from the issued tickets; and
    (g) seventh means for identifying and notifying the entrant associated with the winning ticket to collect a prize associated with the at least one raffle.

11. A system as recited in claim 10, wherein each means is a set of program instructions.

12. A system as recited in claim 10, wherein the prize is a high intangible value item.

13. A system as recited in claim 12, wherein the raffle garners media attention related to the high intangible value item.

14. A system as recited in claim 10, wherein the prize is collected from the entrant agent by the entrant.

* * * * *